(12) United States Patent
Chen

(10) Patent No.: US 12,184,756 B2
(45) Date of Patent: *Dec. 31, 2024

(54) SYSTEM AND METHOD FOR USING DYNAMIC TAG CONTENT

(71) Applicant: Visa International Service Association, San Francisco, CA (US)

(72) Inventor: Yuexi Chen, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/448,012

(22) Filed: Aug. 10, 2023

(65) Prior Publication Data

US 2023/0388104 A1  Nov. 30, 2023

Related U.S. Application Data

(63) Continuation of application No. 17/640,879, filed as application No. PCT/US2020/051429 on Sep. 18, 2020, now Pat. No. 11,777,709.

(Continued)

(51) Int. Cl.
*H04L 9/06* (2006.01)
*H04L 9/32* (2006.01)
*G06K 19/073* (2006.01)

(52) U.S. Cl.
CPC .......... *H04L 9/0618* (2013.01); *H04L 9/3213* (2013.01); *G06K 19/07309* (2013.01)

(58) Field of Classification Search
CPC . H04L 9/3213; H04L 63/0838; H04L 9/0618; H04L 2209/56; H04L 2209/805; H04W 12/06; G06K 19/07309
See application file for complete search history.

(56) References Cited

U.S. PATENT DOCUMENTS 10,511,946 B2   12/2019   Janssens et al.
10,515,359 B2 * 12/2019   Collinge ............ G06Q 20/4012
(Continued)

FOREIGN PATENT DOCUMENTS

EP        2913973 A1    9/2015
KR    20150033393 A    4/2015
(Continued)

OTHER PUBLICATIONS

U.S. Appl. No. 17/640,879, "Notice of Allowance", May 15, 2023, 11 pages.

(Continued)

*Primary Examiner* — Mohammad A Siddiqi
(74) *Attorney, Agent, or Firm* — Kilpatrick Townsend & Stockton LLP

(57) ABSTRACT

A method is disclosed. The method includes a user device storing a message data template comprising a plurality of data fields. A multi-record message may be generated using the message data template in response to an interaction between the user device and an access device. To generate the multi-record message, the user device may increment a counter stored on the user device to produce a counter value, and generate a dynamic cryptogram. The user device may additionally retrieve a credential. The counter value, the dynamic cryptogram, and the credential may then be incorporated into the plurality of data fields of the message data template to form the multi-record message. The multi-record message may be transmitted to the access device, where the access device forwards the multi-record message to an authorization computer to authorize or deny the interaction.

20 Claims, 6 Drawing Sheets

Related U.S. Application Data

(60) Provisional application No. 62/902,679, filed on Sep. 19, 2019.

(56) References Cited

U.S. PATENT DOCUMENTS

| | | | |
|---|---|---|---|
| 10,581,611 | B1 | 3/2020 | Osborn et al. |
| 10,652,233 | B2 | 5/2020 | Hoyer et al. |
| 10,657,754 | B1* | 5/2020 | Osborn ............ G06K 19/07749 |
| 10,757,574 | B1* | 8/2020 | Rule ...................... H04L 63/107 |
| 11,263,625 | B2* | 3/2022 | Glendenning ........ H04L 9/3247 |
| 11,620,633 | B2* | 4/2023 | Wilson ................. G06Q 20/327 |
| | | | 705/41 |
| 11,777,709 | B2* | 10/2023 | Chen ................... H04L 63/0838 |
| | | | 713/170 |
| 2012/0169462 | A1* | 7/2012 | Park ...................... H04W 4/029 |
| | | | 340/5.65 |
| 2013/0054474 | A1 | 2/2013 | Yeager |
| 2013/0262317 | A1* | 10/2013 | Collinge ............ G06Q 20/3265 |
| | | | 705/72 |
| 2014/0189359 | A1 | 7/2014 | Marien et al. |
| 2015/0334095 | A1 | 11/2015 | Thibaudeau |
| 2016/0012696 | A1 | 1/2016 | Robinton et al. |
| 2016/0140545 | A1 | 5/2016 | Flurscheim et al. |
| 2017/0017947 | A1* | 1/2017 | Robinton ............... G06Q 20/40 |
| 2017/0161978 | A1* | 6/2017 | Wishne ............ G06Q 20/40145 |
| 2018/0107994 | A1 | 4/2018 | Anderson et al. |
| 2018/0165441 | A1 | 6/2018 | Everhart |
| 2020/0151311 | A1* | 5/2020 | Noe ........................ G06F 21/33 |
| 2020/0235934 | A1* | 7/2020 | Ashfield ............... H04L 9/3234 |
| 2021/0400031 | A1 | 12/2021 | Ilic et al. |
| 2022/0129894 | A1* | 4/2022 | Phillips ............... G07F 17/0014 |

FOREIGN PATENT DOCUMENTS

| | | |
|---|---|---|
| WO | 2015001376 A1 | 1/2015 |
| WO | 2015101439 A1 | 7/2015 |

OTHER PUBLICATIONS

EP20866011.8, "Extended European Search Report", Mar. 2, 2023, 9 pages.

PCT/US2020/051429, "International Preliminary Report on Patentability", Mar. 31, 2022, 8 pages.

PCT/US2020/051429, "International Search Report and Written Opinion", Dec. 30, 2020, 9 pages.

SABELLA, "NFC For Dummies", 1st Edition, ISBN : 978-1-119, 2016, 241 pages.

* cited by examiner

SYSTEM AND METHOD FOR USING DYNAMIC TAG CONTENT

CROSS-REFERENCE TO RELATED APPLICATIONS

This application is a Continuation Application of U.S. application Ser. No. 17/640,879, filed Mar. 7, 2022, which is a National Stage of International Application No. PCT/US2020/051429, filed Sep. 18, 2020, which claims the benefit of U.S. Provisional Application No. 62/902,679, filed on Sep. 19, 2019, which are herein incorporated by reference in their entirety for all purposes.

BACKGROUND

Systems and methods for processing contactless interactions between user devices and access devices to gain access to resources such as goods and services, secure locations, or secure data are known. However, some systems and methods require the user devices and access devices to have specialized hardware of software in order to interact with each other. This can limit their ability to conduct interactions. For example, a user of a specifically programmed device (such as a specifically programmed access badge or payment card) may wish to conduct an interaction with an access device that does not have the special programming or hardware that would normally be needed to interact with the user device. For example, the user device may be an access badge that is specifically programmed with one type of access badge reader that is programmed with complementary software and hardware. It would be desirable if the user device could be used with an access device other than one that is specifically programmed for use with that user device.

Embodiments of this disclosure address these and other problems, individually and collectively.

SUMMARY

Embodiments of the invention include generating and transmitting messages comprising one or more dynamic elements to an access device that may not have the capability to receive and/or process messages according to certain existing security protocols.

One embodiment of the invention can include a method comprising: storing, by a user device, a message data template comprising data fields for a counter value, a cryptogram, and a credential, the message data template being used to form a multi-record message; initiating, by the user device, an interaction with an access device in a transaction; incrementing, by the user device, a counter stored on the user device to produce the counter value and generating the cryptogram; incorporating, by the user device, the counter value, the cryptogram and the credential into the data fields of the message data template to form a multi-record message; and transmitting, by the user device, the multi-record message to the access device.

Another embodiment of the invention includes a user device comprising a processor, and a computer readable medium comprising code executable by the processor for performing a method comprising: storing a message data template comprising data fields for a counter value, a cryptogram, and a credential, the message data template being used to form a multi-record message; initiating an interaction with an access device in a transaction; incrementing a counter stored on the user device to produce the counter value and generating the cryptogram; incorporating the counter value, the cryptogram and the credential into the data fields of the message data template to form a multi-record message; and transmitting the multi-record message to the access device.

Another embodiment of the invention can include a method comprising: initiating, by an access device, communication with a user device; receiving, by the access device, a multi-record message from the user device, wherein the multi-record message comprises at least a counter value, a cryptogram and a credential; extracting, by the access device, the counter value, the cryptogram, and the credential from the multi-record message; generating, by the access device, an authorization request message, wherein the authorization request message comprises at least the extracted counter value, cryptogram, and credential; transmitting, by the access device, the authorization request message to an authorization computer; and receiving, by the access device, an authorization response message from the authorization computer.

Another embodiment of the invention includes an access device comprising a processor, and a computer readable medium comprising code executable by the processor for performing a method comprising: initiating communication with a user device; receiving a multi-record message from the user device, wherein the multi-record message comprises at least a counter value, a cryptogram and a credential; extracting the counter value, the cryptogram, and the credential from the multi-record message; generating an authorization request message, wherein the authorization request message comprises at least the extracted counter value, cryptogram, and credential; transmitting the authorization request message to an authorization computer; and receiving an authorization response message from the authorization computer.

These and other embodiments are described in further detail below.

DETAILED DESCRIPTION

Figure 1:
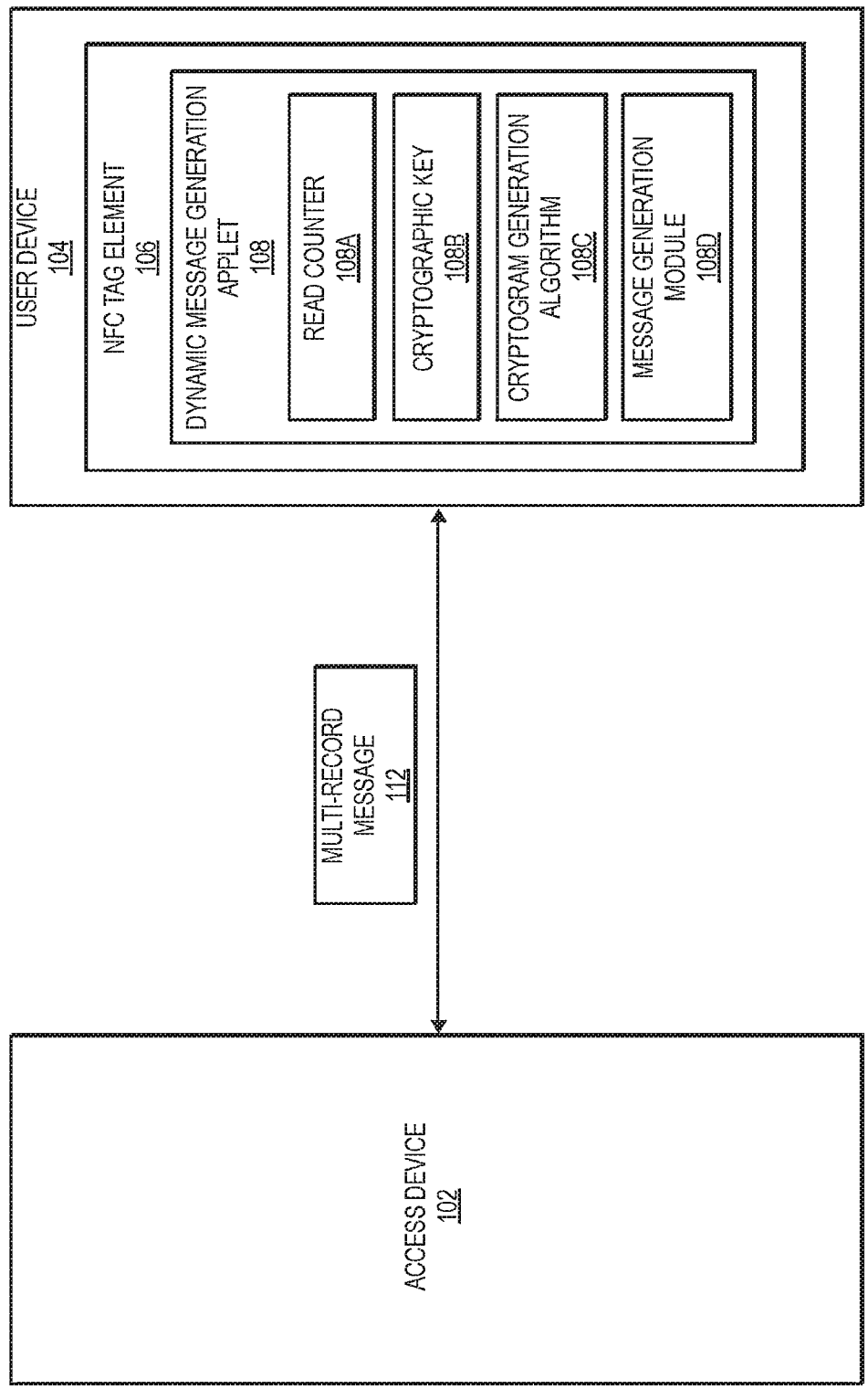
FIG. 1 shows a block diagram depicting a user device enabled with a multi-record generation applet and its interaction with a compatible access device.

Many mobile phones do not have the ability to process transaction and/or access request messages according to specific security protocols (e.g., such as EMV protocol), but they are capable of receiving multi-record messages generated with Near-Field Communication (NFC) tags. However, such messages may not be intrinsically dynamic. They are not capable of producing the necessary encrypted data used in standard transaction and/or access request messages. As a result, the use of these messages to carry sensitive credentials can be risky, since the messages can be vulnerable to copy and redirect attacks.

Embodiments of the invention can include a method. The method includes a user device generating a dynamic multi-record message via an NFC tag element. The NFC tag element can have an ISO14443 A and B interface compatibility. The multi-record message can carry a credential, a cryptogram, and a counter value in a template. The multi-record message can be sent from the user device to a mobile device such as a smart phone. The mobile device can behave as an access device which may grant access to a resource such as secure data, a secure location, or goods and/or services.

In embodiments, the counter value can be generated from incrementing a counter stored on the user device each time the NFC tag element of the user device is activated by a user. The user device can generate a dynamic cryptogram by encrypting the counter value and other data using a stored cryptographic key and a cryptogram generation algorithm (e.g. an AES or 3DES algorithm). After receiving the dynamic cryptogram and other information from the user device, the mobile device can send this information on to an authorization computer. The mobile device can convert the information to a secure format via a software application, or can send it to the authorization computer in the original multi-record message format.

Prior to discussing the details of some embodiments of the present disclosure, description of some terms may be helpful in understanding the various embodiments.

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth low-energy (BLE), Wi-Fi, iBeacon, etc.

A "resource provider" can be an entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "application" may be a computer program that is used for a specific purpose. Examples of applications may include transit applications, secure data access applications, banking applications, digital wallet applications, etc.

"Authentication data" may include any data suitable for authenticating an entity. Authentication data may be obtained from a user or a device that is operated by the user. Examples of authentication data obtained from a user may include PINs (personal identification numbers), biometric data, passwords, etc. Examples of authentication data that may be obtained from a device may include device serial numbers, hardware secure element identifiers, device fingerprints, phone numbers, IMEI numbers, etc.

An "access device" may be any suitable device for providing access to something. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a user device. In some embodiments, where an access device may comprise a mobile device may include a reader, a processor, and a computer-readable medium. A reader may include any suitable contact or contactless mode of operation. For example, user device readers can include radio frequency (RF) antennas, optical scanners, bar code readers, or magnetic stripe readers to interact with a user device.

A "user device" may be any suitable device that can operated by a user. User devices may be in any suitable form. Some examples of user devices include cellular phones, PDAs, personal computers (PCs), tablet computers, payment cards such as credit, debit, and stored value cards, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorization computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user. In some cases, an authorizing entity may additionally be a third-party entity associated with the issuer.

A "user" may include an individual or a computational device. In some embodiments, a user may be associated with one or more personal accounts and/or mobile devices. In some embodiments, the user may be a cardholder, account holder, or consumer.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. An "encryption key" may include any data value or other information suitable to cryptographically encrypt data. A "decryption key" may include any data value or other information suitable to decrypt encrypted data. In some cases, the same key used to encrypt data may be known as a symmetric encryption key.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically, a device associated with a requestor may transmit the access request message to a device associated with a service provider.

"Access request data" may include any information surrounding or related to an access request. Access request data may include access data. Access request data may include information useful for processing and/or verifying the access request. For example, access request data may include details associated with entities (e.g., service provider computer, processing server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), service providing entity data (e.g., service provider data, document owner data, etc.), user data, date and time of an access request, a method utilized for conducting the access request (e.g., contact, contactless, etc.), and other relevant information.

A "cryptogram" may include a piece of encrypted text. In some embodiments, a cryptogram can be used to authenticate an entity such as a device or a user. A cryptogram may comprise static data, dynamic data, or a combination of the two that is encrypted using an encryption key (e.g., a session key or a unique derived key).

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. PA equipment) that indicates approval of the transaction. The code may serve as proof of authorization.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "multi-record message" may be a message containing one or more data elements that have been partitioned into one or more "records". Each record may contain at least one data element and optionally one or more flags or identifiers for a type of data element contained within the record. Data elements may be dynamic or static. One example of a "multi-record message" may be an NDEF (NFC dynamic data exchange format) message.

A "counter" may be any suitable apparatus and/or software used for maintaining a count. A counter may be in communication with one or more other devices, and receive updates to the maintained count by these one or more other devices, wherein the updates indicate an incrementing or a decrementing of the count. A counter may additionally store a counter value which comprises a numerical representation of the count.

A "counter value" may be a numeric value stored by the counter. A counter value may be dynamic, and can change in response to the counter being incremented or decremented due to one or more events, such as initiation of communication between two devices.

A "message data template" may be a preset template or format used for messages of a particular type, such that each message of the particular type follows the same template or format. A message data template may comprise a plurality of data fields that have been determined as necessary for messages of a particular type. Each data field of the plurality of data fields may additionally have a predefined format, such as a length or a data type.

An "NFC tag element" may be a sticker, a chip, and/or any other suitable tag element that has been configured with a RFID (Radio Frequency Identification) reader. A NFC tag element may be able to share data with another mobile device using short-range wireless communication.

Details of some embodiments of the present disclosure will now be described in greater detail.

FIG. 1 shows an access device 102 interacting with a user device 104. The access device 102 receives multi-record messages from the user device 104, and can process the multi-record messages. In embodiments, each multi-record message may comprise a plurality of records, wherein at least one record of the plurality of records contains a dynamic element and/or a static element. In some embodiments, at least one record comprises a dynamic element. In some embodiments, each record of the plurality of records comprises a dynamic element. In some embodiments, one or more of the records within a multi-record message is used to identify a user operating the user device 104 and/or authenticate a validity of a communication between the user device 104 and the access device 102. Exemplary multi-record messages may include (but are not limited to) a URL, a payload, and/or one or more other (static or dynamic) data elements.

The user device 104 may include a NFC tag element 106 that is programmed with a dynamic message generation applet 108 to produce multi-record messages, in accordance with embodiments of the invention.

In some embodiments, the NFC tag element 106 may be a NFC Type 4 tag element. In other embodiments, user device 104 may only comprise dynamic message generation applet 108 that is not within NFC tag element 106. In such embodiments, dynamic message generation applet 108 may be stored directly on a secure element and/or a memory element of user device 104.

In the embodiment in FIG. 1, the dynamic message generation applet 108 can have a read counter 108A, a cryptographic key 108B, a cryptogram generation algorithm 108C, and a message generation module 108D. The read counter 108A can be incremented after the user device 104 interacts with an access device to produce a counter value. Such interactions may occur when a user operating user device 104 wishes to gain access to a resource and/or a location. In some embodiments, the interaction may be a payment transaction.

The counter value produced by the read counter 108 can be encrypted with other data using cryptographic key 108B and the cryptogram generating algorithm 108C to form a dynamic cryptogram. In some embodiments, the cryptogram generation algorithm 108C can be a 3DES or AES algorithm. In some embodiments, the dynamic message genera-tion applet 108 may incorporate the dynamic cryptogram in a multi-record message 112 that is transmitted to the access device 102. In other embodiments, dynamic message generation applet 108 may include both the counter value (prior to encryption) and the dynamic cryptogram within a multi-record message 112.

In some embodiments, an interaction between access device 102 and user device 104 may include access device 102 initiating communication with NFC tag element 106. Communication may be initiated by a user when a user takes the user device 104 and taps and/or swipes NFC tag element 106 of the user device 104 near the access device 102.

Responsive to access device 102 interacting with either NFC tag element 106 or the user device 104, the NFC tag element 106 and/or the user device 104 may prompt the message generation module 108D in the dynamic message generation applet 108 to generate a multi-record message 112. The message generation module 108D can retrieve a template from a memory in the user device 104 and may then populate it with the data described herein. Multi-record message 112 may include at least a dynamic cryptogram (generated using the cryptographic key 108B and the cryptogram generation algorithm 108C), a counter value generated by the reader counter 108A, and a credential stored in the user device 104 within the template. The credential may be a primary account number (PAN), a payment token associated with a PAN, an access token, and/or any suitable user identifying information, such as a user identifier (e.g., a username), a PIN, a password, and/or biometric information associated with the user. In some embodiments, the credential may be provided to the user device 104 during a registration process of the user or the user device 104, and stored within a secure element (not shown) of user device 104. In such embodiments, dynamic message generation applet 108 may request the credential from the secure element of user device 104 during generation of the multi-record message 112.

In some embodiments, the multi-record message 112 may be formatted as an string of alphanumeric characters. The plurality of records within multi-record message 112 may include at least a first record, a second record, and a third record, wherein the first record is the dynamic cryptogram, the second record is the counter value, and the third record is the credential. However, it will be appreciated that additional records may also be included within the multi-record message 112. In some embodiments, the multi-record message may further include one or more strings of buffer data elements, such as a string of alphanumeric characters, between each record. Multi-record message 112 may further be represented as an encoded string. In some embodiments, each record of the plurality of records may be hashed and/or encrypted using a symmetric and/or asymmetric key. In other embodiments, the entirety of multi-record message 112 may be hashed and/or encrypted using a symmetric and/or asymmetric key.

An example of an unpopulated template could be:
61094F07A00000000310106222570C$Credential_Insert$82020FBE9F2608$Cryptogram_Insert$9F3602$Counter_insert$, wherein the template includes at least three data fields for inserting a credential, a cryptogram, and a counter value. An example of the formed template could be:
"61094F07A0000000031010622257 0C47617
39001010176D201220182020FBE9F2608
05B848C479AF49D59F3602002D". In some embodiments, the applet 108 may then convert this hexadecimal value into a base64 string. For instance, the example hex value would be converted into "YQIPB6AAAAADEBBiIIcMR2FzkAEBAXbS ASIBggIPvp8mCAW4SMR5r0nVnzYCAF0=".

Upon generating multi-record message 112, the user device 104 may transmit the generated multi-record message 112 to the access device 102. Access device 102 may receive the multi-record message 112, and can then decode the message 112 using at least a corresponding symmetric and/or asymmetric key.

Access device 102 may then read the contents of message 112. In some embodiments, the access device 102 may further check that the message 112 follows a proper formatting protocol (e.g., not having empty and/or null records).

After receiving the multi-record message, the access device 102 may forward the multi-record message 112 to an authorization computer (not shown in FIG. 1). After receiving the multi-record message 112, the authorization computer may determine whether or not to grant access to the resource and/or location requested by the user operating user device 102. The authorization computer can validate the information contained in the message. The authorization computer may perform validation by tracking a read counter value contained in the message to another counter value maintained at the authorization computer and/or a third-party computer. The authorization computer may additionally validate the cryptogram by decrypting the cryptogram with a shared cryptographic key to obtain the counter value and any other data encoded in the cryptogram. The obtained counter value can be compared with the counter value in the received message.

In response to successfully validating the information contained in the message 112, the authorization computer may determine whether or not to grant the user device (or the user operating the user device) access to the desired resource and/or location.

In other embodiments, after receiving the multi-record message 112, the access device 102 may convert the multi-record message 112 in a first format into a second message in a second format. The second message may include one or more data elements of the multi-record message 112. The access device 102 may then transmit the second message to the authorization computer for authorization. In some embodiments, the second message may be an ISO 8583 message and the authorization computer may be an issuer computer that holds an account associated with the credential in the multi-record message 112.

Figure 2:
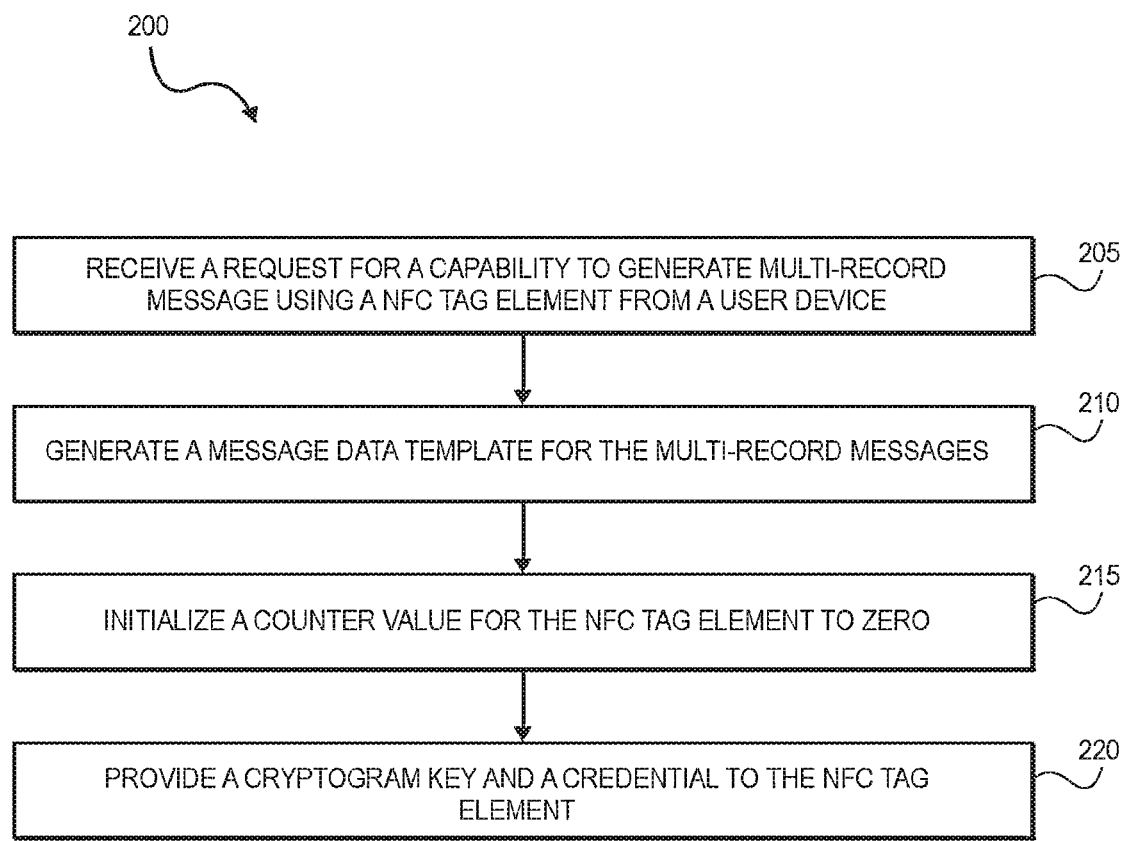
FIG. 2 shows a flowchart diagram illustrating a process of issuing a NFC tag element for generating multi-record messages at a user device.

FIG. 2 shows a flowchart for a registration process of an NFC tag element 106 with a capability for generating multi-record messages at user device 104. In some embodiments, the process may be performed by an authorization computer operated by an authorizing entity (e.g., an issuer) that issues the user device 104. The process may further be performed during issuance of user device 104 to the user.

At step 205, an authorization computer may receive a request to provide an RFID-enabled user device (e.g., a contactless card) with the capability to generate multi-record messages using an NFC tag element. In some embodiments, the request may include a device identifier associated with the user device, and/or a user identifier associated with the user of the user device.

At step 210, the authorization computer may generate a message data template that can be used to generate multi-record messages. For example, the authorization computer could create the following template inside the applet 108 of a NFC tag element:

61094F07A00000000310106222570C$Credential_ Insert$82020FBE9F2608$Cryptogra m_Insert$9F3602$Counter_insert$. The spaces between the dollar signs are data fields where a credential (such as a token or PAN), a cryptogram, and a counter value can be located, respectively.

At step 215, the authorization computer may then initialize a counter value for the NFC tag element to zero. The authorization computer or third-party may additionally associate the counter value with a device identifier and store a copy of the initialized counter value and the corresponding device identifier within a database. This can be done so that the authorization computer can later verify the counter value when multi-record messages are received from the user device The counter value at the authorization computer may also be incremented when interactions with the user device are detected.

At step 220, the authorization computer may further provide a shared cryptographic key and a credential to the NFC tag element. The credential may be retrieved using at least the user identifier included within the request of step 205. In some embodiments, the user identifier may be login credentials and/or any suitable data element that can identify a credential associated with the user operating the user device.

The authorization computer can then complete a registration process of the NFC tag element to the user of the user device (e.g., a card and/or mobile phone).

Figure 3:
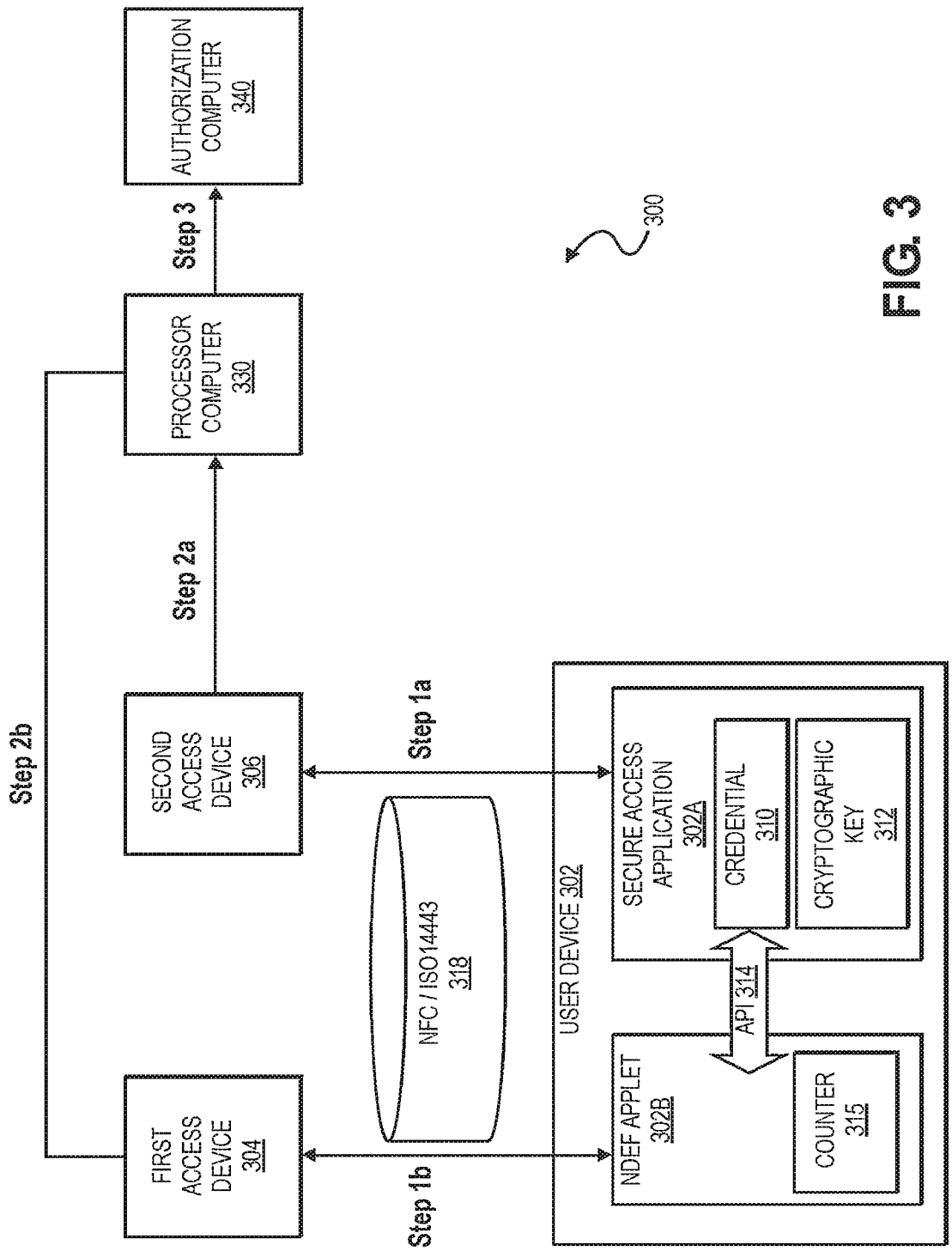
FIG. 3 shows a block diagram depicting a system for processing payment transactions between a first access device and an NDEF application, and a second access device and a secure access application such as an EMV application.

FIG. 3 shows an exemplary system 300 for processing payment transactions with multi-record messages, according to one embodiment of the invention. In this embodiment, the multi-record messages can be NDEF (NFC data exchange format) messages. Typical NDEF messages only comprise static elements stored within a plurality of records. However, embodiments of the invention enable generation of NDEF messages that comprise one or more dynamic elements, in order to ensure security of the interaction being conducted.

Referring to FIG. 3, system 300 may comprise a user device 302 that is enabled with both a secure access application 302A such as a VSDC EMV (Europay MasterCard, Visa) application, and a dynamic NDEF message applet 302B. A VSDC EMV application can be a contactless payment application that is specifically designed to operate using an EMV contactless terminal. Both the secure access application 302A and the dynamic NDEF message applet 302B can be configured to communicate with external access devices using either a same or a different RFID transmitter.

The secure access application 302A may include a credential 310, such as a token and/or a PAN, and a module generating or storing a cryptographic key 312. The dynamic NDEF message applet 302B may perform the functions of a multi-record message generation applet, where the generated multi-record messages are NDEF messages. In embodiments, secure access application 302A and dynamic message applet 302B can communicate with each other using an API 314. In such embodiments, the dynamic NDEF message applet 302B is able to access the credential 310 and/or cryptographic key 312 from the secure access application 302A using the API 314. The credential 310 may be retrieved by the dynamic NDEF message applet prior to generating a NDEF message.

Dynamic NDEF message applet 302B may further include a counter 315 that can produce a counter value. The dynamic NDEF message applet 302B may generate a cryptogram by retrieving the cryptographic key 312 and the credential 310 via the API 314. At least the counter value and the credential can be encrypted with the cryptographic key 312 using one or more data processors (not shown) on the user device 302 to form the cryptogram.

The system 300 may further illustrate the use of the user device 302 with a first access device 304 of a first type, and a second access device 306 of a second type. The second access device 306 may be a standard point-of-sale (POS) terminal and/or another suitable device that is enabled to receive and process typical EMV transaction messages. The first access device 304 may be a mobile phone (such as an iPhone, an Android phone, or a similar device) that cannot receive typical EMV transaction messages. Instead, the first access device 304 may be configured to receive a dynamic NDEF message from the user device 302 and extract the contents of the received NDEF message in order to process the transaction. In embodiments, the first access device 304 may be operated by a first resource provider and the second access device 306 may be operated by a second resource provider.

Both the first access device 304 and the second access device 306 may be configured to generate an authorization request message using the received NDEF message or EMV transaction message, respectively. The authorization request message may include at least a transaction amount, credential 310, and one or more dynamic elements (e.g., a cryptogram) included within the respective NDEF message or EMV transaction message. The generated authorization request message can then be transmitted to a processor computer 330.

The processor computer 330 may be disposed between one of the first access device 304 or the second access device 306 and an authorization computer 340. In some embodiments, the processor computer 330 may be a network switch that switches messages between different authorization computers and transport computers (not shown) operated by intermediary processes such as acquirers. In some embodiments, the processor computer 330 may include data processing subsystems, networks, and operations used to support and deliver authorization services, exception file services, and clearing and settlement services. In some embodiments, the processor computer 330 may be in a payment processing network. An exemplary payment processing network may include VisaNet™. Payment processing networks such as VisaNet™ are able to process credit card transactions, debit card transactions, and other types of commercial transactions.

The system 300 additionally includes authorization computer 340, which receives authorization request messages for interactions and decides whether to authorize or decline them. In some embodiments, the authorization computer 340 may be an issuer computer. The authorization computer 340 may validate the one or more dynamic elements (e.g., such as a cryptogram) included within the authorization request message, and may determine if an account associated with a credential (e.g., a token or PAN) in the authorization request message is in good standing or has sufficient value to authorize the interaction.

Referring still to FIG. 3, two exemplary transactions can be described. The first transaction can be a conventional payment transaction using an EMV-enabled second access device 306. The second transaction can be a payment transaction that is conducted using the first access device 104, which is not enabled to process EMV messages, but can implement a similar functionality using dynamic NDEF messages.

In a conventional transaction, a user may wish to use the user device 302 to obtain a resource (e.g., a product) from a resource provider that operates the second access device 306, which may be a contactless POS terminal. The user initiates the transaction by passing the user device 203 by the second access device 306. The second access device 306 exchanges messages according to an EMV protocol with the user device 302.

Responsive to the user device 302 initiating the payment transaction, the second access device 306 may initiate an APDU protocol and send an available applications request to the user device 302 to request information regarding the payment application(s) (e.g., a list of AID(s)) that are available on the user device 302. The available applications request may include a payment environment identifier (e.g., a PPSE name) to identify the payment environment supported by the second access device 306 and user device 302.

The user device 302 can process the received request by recognizing the payment environment identifier (e.g., PPSE name) included in the request. The user device 302 can then send an available applications response back to the second access device 306. The available applications response may include a list of available AIDs. In some embodiments, the available applications response may be in the form of a select PPSE response. Available AIDs may include the secure access application 302A.

The second access device 306 may receive the available applications response and may select an application from the list of available AIDs in the available applications response. In some embodiments, the selected application may be a highest priority application available on user device 302 that is supported by the access device. The second access device 306 may then transmit an application selection message comprising the selected application to user device 302. The application selection message may be in the form of a select AID command. In this embodiment, the selected application is the secure access application 302A.

In some embodiments, the secure access application 302A may transmit a request for transaction details (in the form of a select AID response) to the second access device 306. The request comprises a list of transaction data identifiers to request the appropriate data from access device 306. The list of transaction data identifiers can be in the form of a processing options data object list (PDOL).

The second access device 306 may then transmit the transaction details, in the form of a GPO ("Get Processing Options") command, to the user device 302. Transaction details may include a transaction amount, a transaction date, an identifier for the desired product, a resource provider identifier, etc.

User device 302 may then retrieve the credential 310 from the secure access application 302A, and can generate a dynamic cryptogram using the cryptographic key 312. The user device 302 may format the credential 310, the dynamic cryptogram, and one or more of the received transaction details into a secure message such as a secure EMV message. The user device 302 may then transmit the secure message to the second access device 306.

At step 2a, the second access device 306 may generate an authorization request message using the above-described data, and may transmit the generated authorization request message to the processor computer 330.

At step 3, the processor computer 330 forwards the generated authorization request message to authorization computer 340. The authorization computer 340 determines whether or not to authorize the transaction. The authorization computer 340 may then transmit an authorization response message based on this determination to the second access device 306 via the payment processor 330. The second access device 306 can then indicate if the transaction is authorized or not.

The user device 302 is also configured to process transactions using at least NDEF messages that can be received by the first access device 304, which is of a different type than the second access device 306.

With reference to step 1b of FIG. 3, the same user may use the user device 302 to access a resource of a resource provider operating the first access device 304. In some embodiments, the user may initiate the transaction by tapping user device 302 against the first access device 304.

In embodiments, at least an application selection message may be transmitted by the first access device 304 to user device 302. In this embodiment, the selected application is instead the dynamic NDEF message applet 302B. The first access device 304 may also send a payment request comprising transaction details to the user device 302. In other embodiments, the transaction details may further include a flag and/or an indicator that the first access device 304 can only receive NDEF messages.

In response, dynamic NDEF message applet 302B may extract one or more of the transaction details from the payment request and retrieve the credential 310 and the cryptographic key 312 from the secure access application 302A using the API 314. The dynamic NDEF applet 302B may generate a dynamic cryptogram by encrypting at least a counter value from the counter 315 and the credential 310 with the cryptographic key 312.

The dynamic NDEF message applet 302B may then generate a hexademical string comprising a plurality of data elements such as (but not limited to) some transaction details (e.g., a transaction amount), credential 310, the dynamic cryptogram, and the counter value. In some embodiments, the hexadecimal string may be generated using an NDEF message template stored on the dynamic NDEF applet 302B. The hexadecimal string may then be converted into a Base64 string, which is sent as an NDEF message 318 to first access device 304. In embodiments, each data element of the plurality of data elements may be stored in a separate record of the NDEF message 318. In some embodiments, the NDEF message may be encrypted using a symmetric and/or asymmetric key by the user device 302.

The first access device 304 then decrypts and reads the NDEF message 318. In some embodiments, the first access device may also convert NDEF message 318 into authorization request message in an ISO 8583 message format.

At step 2b, the first access device 304 then transmits the message to the processor computer 330. In some embodiments, the processor computer 330 may read the message 318 and verify that the contents of message 318 are in a suitable format for authorization.

At step 3, the processor computer 330 may transmit the message 318 to the authorization computer 340. The authorization computer 340 may then validate one or more data elements included within message 318. Validation may include extracting at least the counter value and the dynamic cryptogram from the message. In some embodiments, the authorization computer 340 may have a database storing a counter value associated with the user device 302. The authorization computer 340 may verify that its counter value matches the counter value included in message 318.

The authorization computer 340 may additionally validate the extracted dynamic cryptogram using a shared cryptographic key to decrypt the cryptogram. In some embodiments, the authorization computer 340 may obtain a counter value by decrypting the cryptogram, and may verify that the obtained counter value matches the counter value extracted from the message. In other embodiments, the authorization computer 340 may generate a second cryptogram using the counter value extracted from message 318 and its shared cryptographic key. The authorization computer 340 may then compare the second cryptogram to the cryptogram received in message 318 to determine a match. If a match is determined, the cryptogram may be determined to be valid.

Responsive to validating the one or more data elements included within message 318, authorization computer 340 may additionally extract the credential 310 from the message and may determine if the account associated with the credential has sufficient value to authorization the transaction. The authorization computer 340 may then authorize the transaction and generate an authorization response message. The authorization response message may be forwarded to the first access device 304 via the processor computer 330. The first access device 304 may indicate whether the transaction is authorized or declined.

By using this process, any access device compatible with NDEF messaging (corresponding to first access device 304) can be used in a similar manner as a POS device (represented by second access device 306). By tapping the user device 302 to first access device 306, a transaction may be initiated. The transaction can include sending a NDEF message 318 to a device that can process it (e.g., convert it to another format), and that can pass it to a payment processor 330 and/or an authorization computer 340, which can authorize or decline the transaction request. Embodiments allow any NDEF compatible access device to be used as a contactless POS device that operates under an EMV protocol. That is, the user device 302 can be used with two different types of access devices, while using only one stored credential and one stored cryptographic key. This not only increases the utility of the user device relative to conventional user devices, it also provides greater security as the credentials and keys need not be duplicated for multiple applications on the user device 302.

Figure 4:
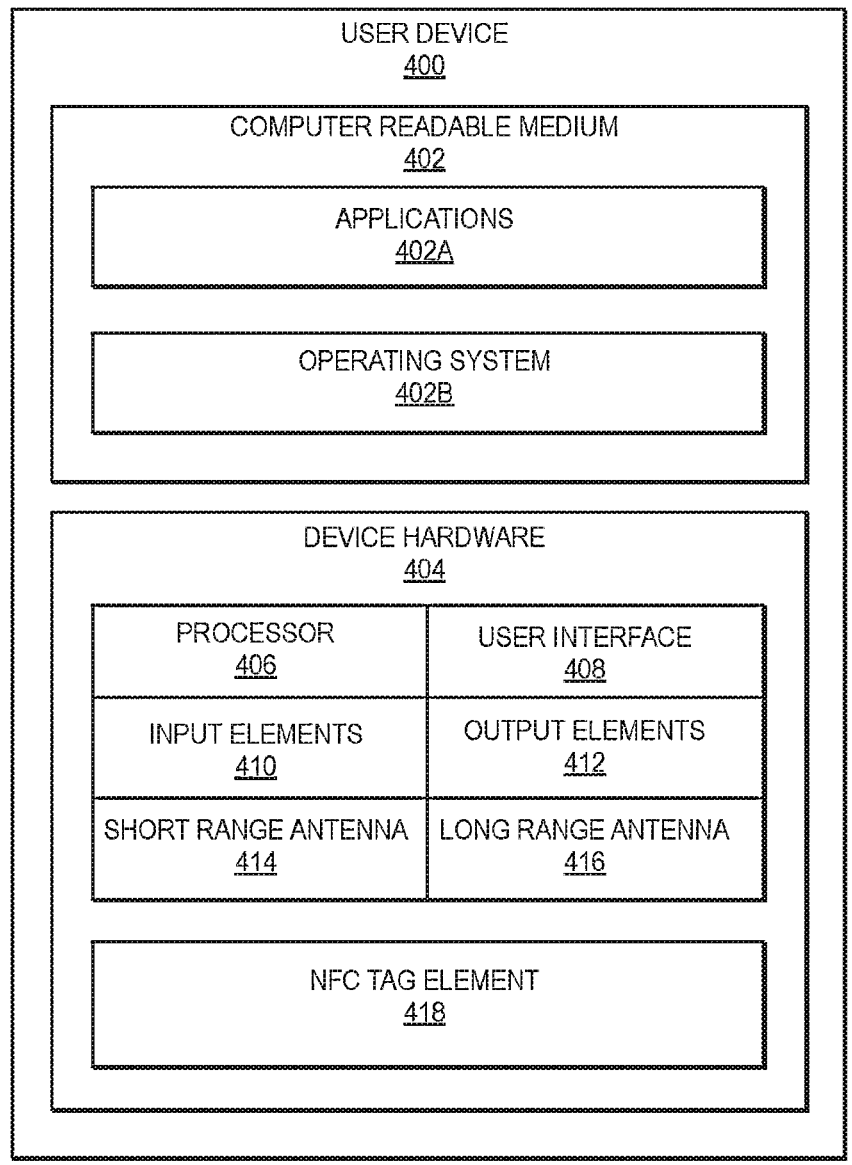
FIG. 4 shows a block diagram depicting a user device, in accordance with embodiments of the invention.

FIG. 4 shows a block diagram of an exemplary user device 400 that can be used in embodiments of the invention.

The user device 400 may comprise a computer readable medium 402, which can be in the form of (or may be included in) a memory element that stores data and can be in any suitable form (e.g., microSD chip, SIM card, or other type of memory element). The computer readable medium 402 may store one or more applications 402A and an operating system 402B for the device. The computer readable medium 402 may also comprise code, executable by the processor 406, to cause the user device 400 to perform a process including storing, by a user device, a message data template comprising data fields for a counter value, a cryptogram, and a credential, the message data template being used to form a multi-record message; initiating, by the user device, an interaction with an access device; incrementing, by the user device, a counter stored on the user device to produce the counter value and generating the cryptogram; incorporating, by the user device, the counter value, the cryptogram and the credential into the data fields of the message data template to form a multi-record message; and transmitting, by the user device, the multi-record message to the access device.

The user device 400 may also include device hardware 404, comprising at least: a processor 406, a user interface 408, input elements 410, and/or output elements 412. The device hardware 404 may also include a short range antenna 414 and a long range antenna 416 for communicating with a wireless network and/or other devices.

In embodiments, user device 400 may additionally include a NFC tag element 418. Components in the tag element 418 are described in FIG. 1 with respect to tag element 106.

Figure 5:
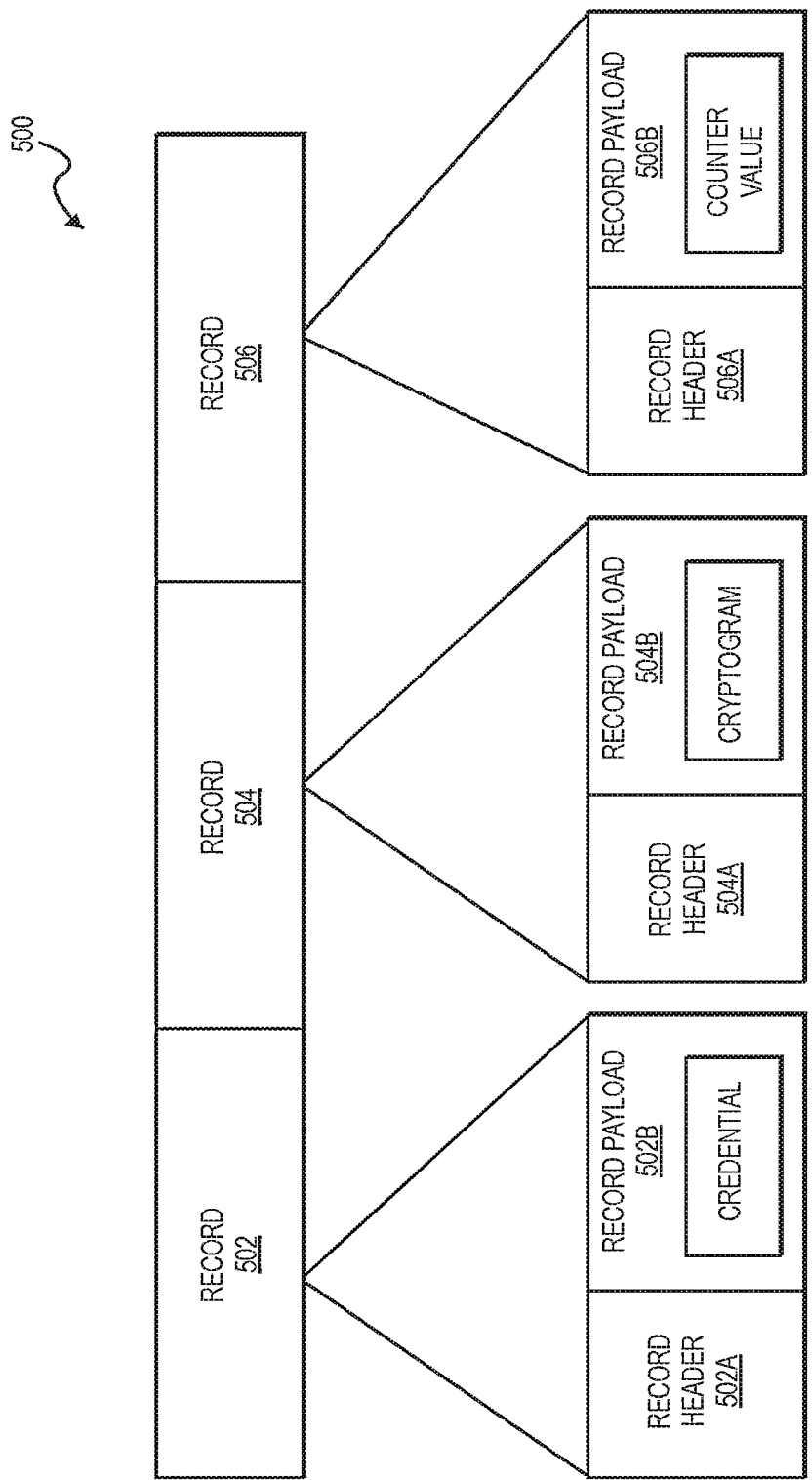
FIG. 5 shows a block diagram depicting an exemplary multi-record message comprising at least one or more dynamic elements in accordance with embodiments of the invention.

FIG. 5 shows a block diagram of an exemplary multi-record message 500, in accordance with embodiments of the invention.

Multi-record message 500 may include a plurality of records, comprising at least record 502, record 504, and record 506. Message 500 may also include additional records before record 502 and/or after record 506, which are not depicted in the figure. For example, the message 500 can include a record 508, a record 510, a record 512, etc. In most embodiments, the message 500 comprises at least 2 or more records.

Each record may further include a record header and a record payload. In some embodiments, each record may further include additional information such as a message identifier that is unique for every generated multi-record message.

With reference to record 502, record header 502A may comprise one or more metadata elements for the record 502. For example, the record header may include a data field for a payload type and a data field for a payload length. In some embodiments, the record header 502A may additionally include a data field for an identifier for a payload and a data field for a length of the identifier. In some embodiments, the record header 502A may further include one or more flags that indicate where the record is in message. For example, the record header 502A can include one or more flags or data that indicate whether the record header 502A is a first record of the message (e.g., a message begin flag) and/or whether the record header 502A is a last record of the message (e.g., a message end flag). The one or more flags or data may also indicate a format for one or more of the data fields (e.g., a type name format flag and/or a ID length flag).

The record payload may include a static or dynamic data element. Exemplary data elements may be a credential, a public key, a URL, a counter value, etc. In some embodiments, the record payload may be encrypted and/or encoded by a symmetric or asymmetric key. Still referring to record 502, record payload 502B may include a credential that can be used to gain access to a resource and/or location. Record 504 and record 506 may additionally include record payloads comprising a cryptogram and a counter value, respectively. In some embodiments, a record payload may be split into more than one records. For example, record payload 502B may include only a portion of a credential while a corresponding record payload for another record 508 (not pictured in the figure) includes a remaining portion of the credential. Therefore, a device receiving the multi-record message 500 (e.g., an access device) can extract data from both the record payload 502B and the record payload for record 508 in order to obtain the entire credential.

Figure 6:
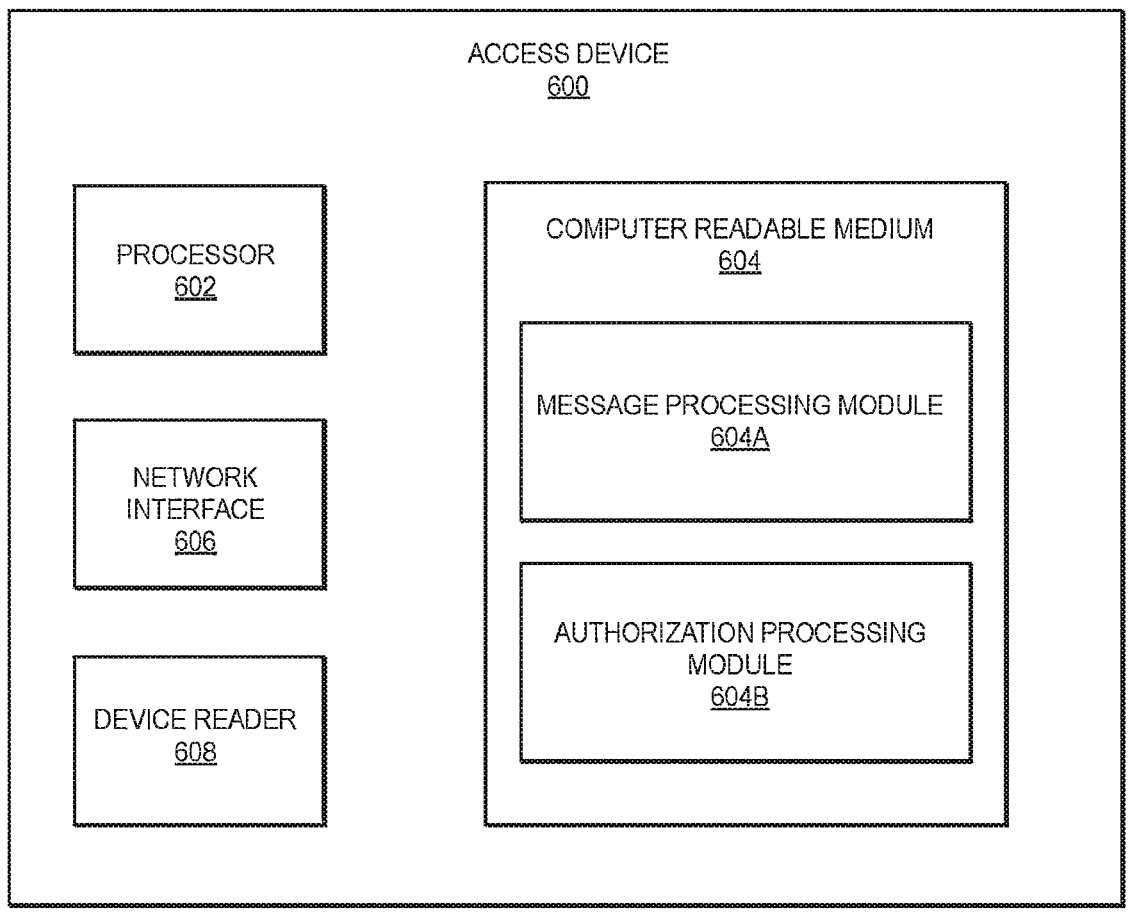
FIG. 6 shows a block diagram depicting an access device, in accordance with embodiments of the invention.

FIG. 6 shows a block diagram of an access device 600 in accordance with embodiments of the invention. The access device may include a processor 602 and a network interface 606 for receiving and transmitting messages (e.g. such as, but not limited to, a multi-record message, an authorization request message, and/or an authorization response message) to one or more entities (e.g., user device 400 and/or an authorization computer). The access device 600 may also include a device reader 608 for reading data (e.g., via NFC) from a user device.

The access device 600 may include a non-transitory computer readable medium 604, comprising a message processing module 604A and an authorization processing module 604B. The message processing module 604A may include code, executable by the processor 602 to read contents of a received multi-record message and determine if the message is suitable to send to an authorization computer (or a payment processor in communication with the authorization computer).

The authorization processing module 604B may be used, in conjunction with the processor 602, to convert the multi-record message into a second message comprising at least one or more dynamic elements included within the multi-record message and send the second message to the authorization computer (or the payment processor). In some embodiments, the second message may be a standard authorization request message. In further embodiments, the authorization processing module 604B may receive an authorization response message from the authorization computer (or the payment processor) and determine if access to a resource and/or location is granted to a user based on the authorization response message.

The non-transitory computer readable medium 604 may comprise code, executable by the processor 602, for implementing a method comprising: initiating communication with a user device; receiving a multi-record message from the user device, wherein the multi-record message comprises at least a counter value, a cryptogram and a credential; extracting the counter value, the cryptogram, and the credential from the multi-record message; generating an authorization request message, wherein the authorization request message comprises at least the extracted counter value, cryptogram, and credential; transmitting, by the access device, the authorization request message to an authorization computer; receiving, by the access device, an authorization response message from the authorization computer.

Embodiments of the invention have multiple technical advantages. Embodiments of the invention include a user device that is capable of interacting with different types of access devices, while maintaining security for all types of access devices. Embodiments of the invention can also allow different applications for different access devices to share a credential and a cryptographic key via in API. This improves data security and reduces data storage requirements, since the credential and cryptographic key need not be stored as duplicates on the user device The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. An access device comprising:
a processor; and
a non-transitory computer readable medium comprising code, executable by the processor, for performing operations comprising:
initiating communication with a user device in an interaction;
receiving a multi-record message originating from the user device, wherein the multi-record message comprises at least a counter value, a cryptogram and a credential in a message data template;
extracting the counter value, the cryptogram, and the credential from the multi-record message;
generating an authorization request message, wherein the authorization request message comprises at least the extracted counter value, cryptogram, and credential;
transmitting the authorization request message to an authorization computer; and
receiving an authorization response message from the authorization computer.

2. The access device of claim 1, wherein the multi-record message is an NDEF message.

3. The access device of claim 1, wherein the multi-record message comprises a plurality of records, and the plurality of records include a first record for the credential, a second record for the cryptogram, and a third record for the counter value.

4. The access device of claim 1, wherein the interaction includes a request for access to a resource or to a secure location.

5. The access device of claim 1, wherein the access device is a POS terminal.

6. The access device of claim 1, wherein the interaction includes a request to obtain a resource.

7. The access device of claim 1, wherein the message data template was generated by the authorization computer.

8. The access device of claim 1, wherein the message data template was generated by a third-party associated with the authorization computer.

9. The access device of claim 8, wherein the authorization computer is an issuer computer.

10. The access device of claim 8, wherein the credential is an account number.

11. The access device of claim 1, wherein the operations further comprises:
checking the multi-record message to determine if the multi-record message is properly formatted.

12. The access device of claim 1, wherein the access device is a mobile phone.

13. The access device of claim 1, wherein the counter value, the cryptogram and the credential in the message data template are concatenated values.

14. A computer comprising:
a processor; and
a non-transitory computer readable medium comprising code, executable by the processor, for performing operations comprising:
receiving a multi-record message originating from a user device, wherein the multi-record message comprises at least a counter value, a cryptogram and a credential in a message data template;
extracting the counter value, the cryptogram, and the credential from the multi-record message; and
performing authorization processing using the extracted counter value, cryptogram, and credential.

15. The computer of claim 14, wherein performing authorization processing comprises sending an authorization response message to an access device.

16. The computer of claim 14, wherein performing authorization processing comprises sending an authorization request message comprising the counter value, the cryptogram, and the credential to an authorizing entity computer for authorization.

17. The computer of claim 14, wherein the computer is an authorizing entity computer.

18. The computer of claim 14, wherein the computer is an access device.

19. A method comprising:
receiving, by a computer, a multi-record message originating from a user device, wherein the multi-record message comprises at least a counter value, a cryptogram and a credential in a message data template;
extracting, by the computer, the counter value, the cryptogram, and the credential from the multi-record message; and
performing, by the computer, authorization processing using the extracted counter value, cryptogram, and credential.

20. The method of claim 19, wherein the multi-record message is an NDEF message.

* * * * *